United States Patent
Lucero et al.

(10) Patent No.: US 10,194,484 B2
(45) Date of Patent: Jan. 29, 2019

(54) APPARATUS AND METHOD FOR INITIATING AN EMERGENCY CALL USING A PERSONAL COMMUNICATION DEVICE

(71) Applicant: Ford Global Technologies, LLC, Dearborn, MI (US)

(72) Inventors: Jacob Lucero, Dearborn Heights, MI (US); Thomas Lee Miller, Ann Arbor, MI (US); Eric L. Reed, Livonia, MI (US); Cameron Smyth, Wyandotte, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 56 days.

(21) Appl. No.: 14/857,341

(22) Filed: Sep. 17, 2015

(65) Prior Publication Data
US 2017/0086045 A1    Mar. 23, 2017

(51) Int. Cl.
| H04M 11/04 | (2006.01) |
| H04W 76/50 | (2018.01) |
| H04W 4/90  | (2018.01) |
| H04W 4/80  | (2018.01) |

(52) U.S. Cl.
CPC ............ H04W 76/50 (2018.02); H04W 4/80 (2018.02); H04W 4/90 (2018.02)

(58) Field of Classification Search
CPC ...... H04W 4/22; H04W 4/008; H04W 76/007
USPC ................ 455/404.1, 569.2, 575.9
See application file for complete search history.

(56) References Cited

U.S. PATENT DOCUMENTS

| 5,687,215 | A | * | 11/1997 | Timm | G01S 5/0027 455/404.2 |
| 5,933,080 | A | * | 8/1999 | Nojima | G08B 25/016 340/3.3 |
| 6,076,028 | A | * | 6/2000 | Donnelly | B60R 21/013 701/45 |
| 6,161,071 | A | * | 12/2000 | Shuman | G08G 1/096888 340/436 |
| 6,184,791 | B1 | * | 2/2001 | Baugh | A61B 5/1114 340/439 |
| 6,222,461 | B1 | * | 4/2001 | Hazen | B61L 29/28 340/436 |
| 6,340,928 | B1 | * | 1/2002 | McCurdy | B60Q 1/52 340/436 |
| 7,466,992 | B1 | * | 12/2008 | Fujisaki | H04M 1/274516 455/412.1 |
| 7,904,053 | B2 | | 3/2011 | Krasner et al. | |
| 8,467,933 | B2 | | 6/2013 | Miller et al. | |
| 8,755,764 | B2 | * | 6/2014 | Yi | H04W 76/007 342/357.31 |
| 8,761,821 | B2 | * | 6/2014 | Tibbitts | H04W 48/04 455/297 |
| 8,903,354 | B2 | | 12/2014 | Hatton | |

(Continued)

*Primary Examiner* — Marceau Milord
(74) *Attorney, Agent, or Firm* — Jennifer Stec; Brooks Kushman P.C.

(57) ABSTRACT

A vehicle system includes a controller configured to receive a vehicle state signal indicative of a vehicle being in an emergency state, repeatedly transmit a request, via Bluetooth Low Energy (BLE), to a personal communication device (PCD) to contact an emergency provider in response to receiving the vehicle state signal, and stop transmitting the request to contact the emergency provider in response to receiving an acknowledgement from the PCD that the emergency provider was contacted.

18 Claims, 6 Drawing Sheets

(56) References Cited

U.S. PATENT DOCUMENTS

| | | | | |
|---|---|---|---|---|
| 8,922,357 B2* | 12/2014 | Miller | B60R 25/24 340/426.13 |
| 8,989,952 B2* | 3/2015 | Simon | G08G 1/205 342/70 |
| 9,049,584 B2* | 6/2015 | Hatton | G04W 4/22 |
| 9,113,288 B2* | 8/2015 | Sauerbrey | H04W 4/008 |
| 9,171,450 B2* | 10/2015 | Cho | G08B 25/10 |
| 9,210,256 B1* | 12/2015 | Humphrey | H04M 3/2281 |
| 9,333,946 B2* | 5/2016 | Simon | B60R 25/24 |
| 9,386,447 B2* | 7/2016 | Tibbitts | H04W 8/245 |
| 9,615,213 B2* | 4/2017 | Tibbitts | H04W 4/027 |
| 9,756,132 B2* | 9/2017 | Khan | H04L 67/12 |
| 2012/0109692 A1* | 5/2012 | Collins | G06Q 30/00 705/4 |
| 2012/0129545 A1* | 5/2012 | Hodis | G01S 5/0257 455/456.1 |
| 2012/0323763 A1* | 12/2012 | Michael | G06Q 30/02 705/39 |
| 2013/0297387 A1* | 11/2013 | Michael | G08G 1/0112 705/13 |
| 2015/0120336 A1* | 4/2015 | Grokop | B60W 40/09 705/4 |

* cited by examiner

APPARATUS AND METHOD FOR INITIATING AN EMERGENCY CALL USING A PERSONAL COMMUNICATION DEVICE

TECHNICAL FIELD

Aspects of the present disclosure provide an apparatus and method for a vehicle Bluetooth Low Energy (BLE) system to collaborate with one or more personal communication devices (PCDs) located either inside or outside the vehicle to contact an emergency service.

BACKGROUND

The U.S. Pat. No. 8,467,933 discloses a system for controlling the operation of performing emergency notification in a vehicle. The system comprises a controller configured to receive at least one driver status signal indicative of whether the driver is one of the primary driver and the secondary driver from a key ignition device positioned on at least one of a primary key and the secondary key. The controller is configured to determine whether the driver of the vehicle is one of the primary and the secondary driver based on the at least one driver status signal. The controller is configured to selectively control the operation of performing emergency notification based on whether the driver of the vehicle is one of the primary driver and the secondary driver.

The U.S. Pat. No. 7,904,053 discloses a method and apparatus for providing emergency notification by a wireless mobile device in response to triggering a sensor. A detection system, which may be located within a vehicle, comprises one or more sensors configured to sense an emergency event and transmit a message via a wireless link regarding the emergency event. The wireless mobile device may be programmed to call a predetermined emergency number such as E911, and transmit data including position and other information from the mobile device to the emergency number in response to the received message.

SUMMARY

A vehicle system includes a controller configured to receive a vehicle state signal indicative of a vehicle being in an emergency state, repeatedly transmit a request, via Bluetooth Low Energy (BLE), to a personal communication device (PCD) to contact an emergency provider in response to receiving the vehicle state signal, and stop transmitting the request to contact the emergency provider in response to receiving an acknowledgement from the PCD that the emergency provider was contacted.

A personal communication device (PCD) includes a controller configured to receive a request from a vehicle, via Bluetooth Low Energy (BLE), to contact an emergency provider, and transmit an acknowledgement to the vehicle, via BLE, that the emergency provider was contacted in response to either receiving a first input accepting the request and contacting the emergency provider, or receiving a second input rejecting the request, transmitting the request to a service provider server (SPS), and receiving from the SPS a signal indicating that the emergency provider was contacted.

A method for a vehicle includes receiving, by a controller including a transceiver, a vehicle emergency state signal, transmitting a request, via Bluetooth Low Energy (BLE), to a personal communication device (PCD) to contact an emergency provider in response to the emergency state signal, receiving, at the controller, via BLE, a PCD acknowledgement indicating the emergency provider was contacted, and stopping, at the controller, the transmitting of the request in response to receiving the acknowledgement.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
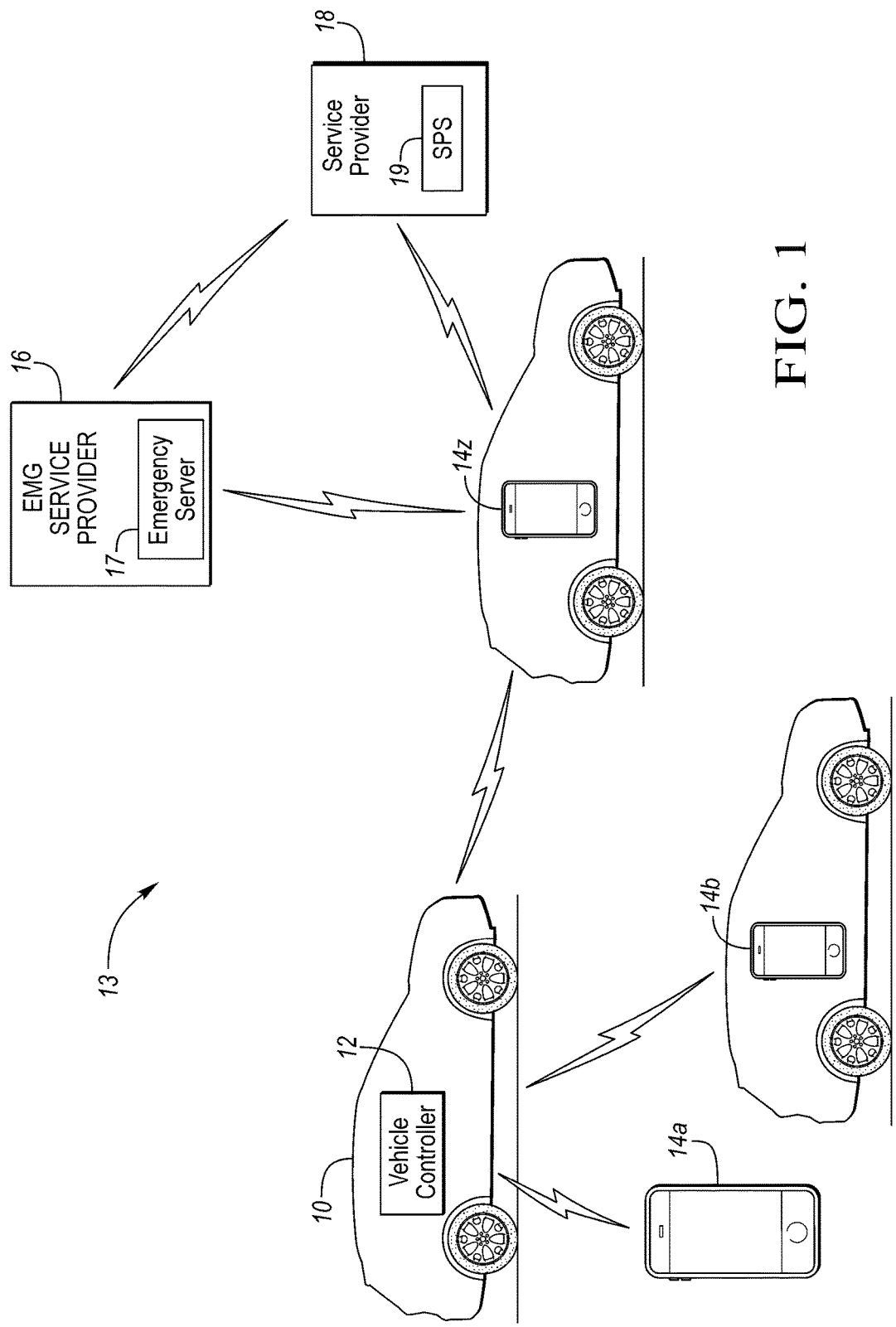
FIG. 1 depicts an implementation that utilizes Bluetooth Low Energy (BLE) for wireless communication with one or more personal communication devices (PCDs)

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

In the event of an accident, a driver may be unable or slow in contacting emergency services. This becomes a problem if the driver and passengers are in an emergency state. There are currently services to contact emergency personnel without assistance in the event of an accident, but these services require a subscription or a phone to be connected to the vehicle.

Without an available wireless network service or a phone paired to the vehicle, an impaired driver could be in danger. For example, a driver could lose control of a car and crash into a ditch where visibility from the road is limited. With the driver impaired, and limited visibility of the accident, passersby might not notice the vehicle. Thus, in view of the foregoing, a system and method for the vehicle to initiate an emergency call using one or more personal communication devices (PCDs) are provided here.

The embodiments provided herein disclose an apparatus and method to automatically detect an emergency event, to electronically initiate a request to contact emergency personnel, and to notify the driver when the emergency personnel have been alerted. The apparatus and method utilize Bluetooth Low Energy (BLE) for wireless communication between a controller, including an advertiser, in the vehicle for detecting an emergency event and a scanner positioned in a personal communication device (PCD) for purposes of electronically initiating an emergency call. One example of an apparatus that utilizes BLE communication in a vehicle setting is described in International Publication No. PCT/US2015/10311 filed on Jan. 6, 2015, now WO 2015/103605 issued on Jul. 9, 2015, to Miller et al. which is hereby incorporated by reference in its entirety. One advantage of the advertiser/scanner relationship as set forth herein is that neither device has to be electronically paired and connected to authorize communication between the devices.

The BLE advertiser/scanner interface described above can be applied to the automotive environment to facilitate the apparatus and method for electronically initiating a request to contact an emergency service wirelessly and automatically in response to detecting an emergency event. A BLE based transceiver may be included in the vehicle controller and function in the advertiser role within the BLE environment. Such a transceiver may advertise a set of data including, but not limited to, vehicle location, vehicle description, number of vehicle occupants, identifier unique to the vehicle, status of seat belts and air bags, and other data that may allow the emergency personnel to more efficiently determine vehicle geographic location, as well as, evaluate the extent of the emergency. Likewise, another BLE based transceiver may be positioned in a PCD and function in the scanner role within the BLE environment. This PCD transceiver may receive advertisements from transceiver(s) positioned in the vehicle and process the received data. Then, in case of an emergency, the vehicle may electronically alert emergency personnel via the PCD and receive an electronic acknowledgement from the PCD when the emergency services contact has been established. A vehicle controller may receive an electronic notification of an emergency event occurrence from other vehicle controllers. This aspect will be discussed in more detail below in reference to FIG. 1.

FIG. 1 depicts a vehicle 10 equipped with a vehicle controller 12 for initiating an emergency call using a personal communication device (PCD) 14 in a wireless network 13, in response to determining that an emergency event occurred, and receiving an acknowledgement when an emergency service provider (emergency provider) 16 has been contacted. The emergency provider 16 includes at least one emergency service server (emergency server) 17 to enable the receiving of a request for emergency assistance and dispatching the emergency assistance services to an end user including, for example, police, fire department, emergency medical services (EMS) or ambulance, and so on. It is recognized that the emergency provider 16 may be used interchangeably with at least one emergency server 17 herein.

The vehicle controller 12 may contact the emergency server 17 via the PCD 14. The PCD 14 may be configured to function in a scanner form and may be implemented as a mobile phone, tablet, laptop, wearable computer, and so on. The PCD 14 includes an interactive display, such as a touch screen, a button selector, and so on, for receiving a user input. The PCD 14 is configured to accept the request to contact the emergency provider 16, such as 911, a public safety answering point (PSAP), or emergency operator, and to transmit an electronic acknowledgement when contact with the emergency provider 16 has been established.

The PCD 14 is further configured to reject the electronic request from the vehicle controller 12 to contact the emergency server 17 and to contact a service provider 18 indicating that the vehicle 10 may be experiencing an emergency situation. The service provider 18 includes at least one service provider server (SPS) 19 to enable the providing of wireless communication services to the PCD 14 using the network infrastructure, the network devices, and other elements necessary to sell and deliver services to an end user including, for example, radio spectrum allocation, back haul infrastructure, billing, customer care, provisioning computer systems and marketing and repair organizations. Examples of the service provider 18 may be, but not limited to, Sprint, T-Mobile, AT&T, etc. It is recognized that the service provider 18 may be used interchangeably with at least one SPS 19 herein.

The SPS 19 is configured to electronically receive a notification from the PCD 14 that the vehicle 10 may be experiencing an emergency event. The SPS 19 may be further configured to electronically contact the emergency server 17 to indicate that the vehicle 10 may be experiencing an emergency situation in response to confirming that the vehicle 10 may indeed be in distress. The SPS 19 may transmit an electronic acknowledgement to the PCD 14 when the contact with the emergency server 17 has been established. The PCD 14 may transmit a signal to the vehicle controller 12 indicating that the contact with the emergency server 17 has been established in response to receiving an electronic acknowledgement from the SPS 19.

Figure 2:
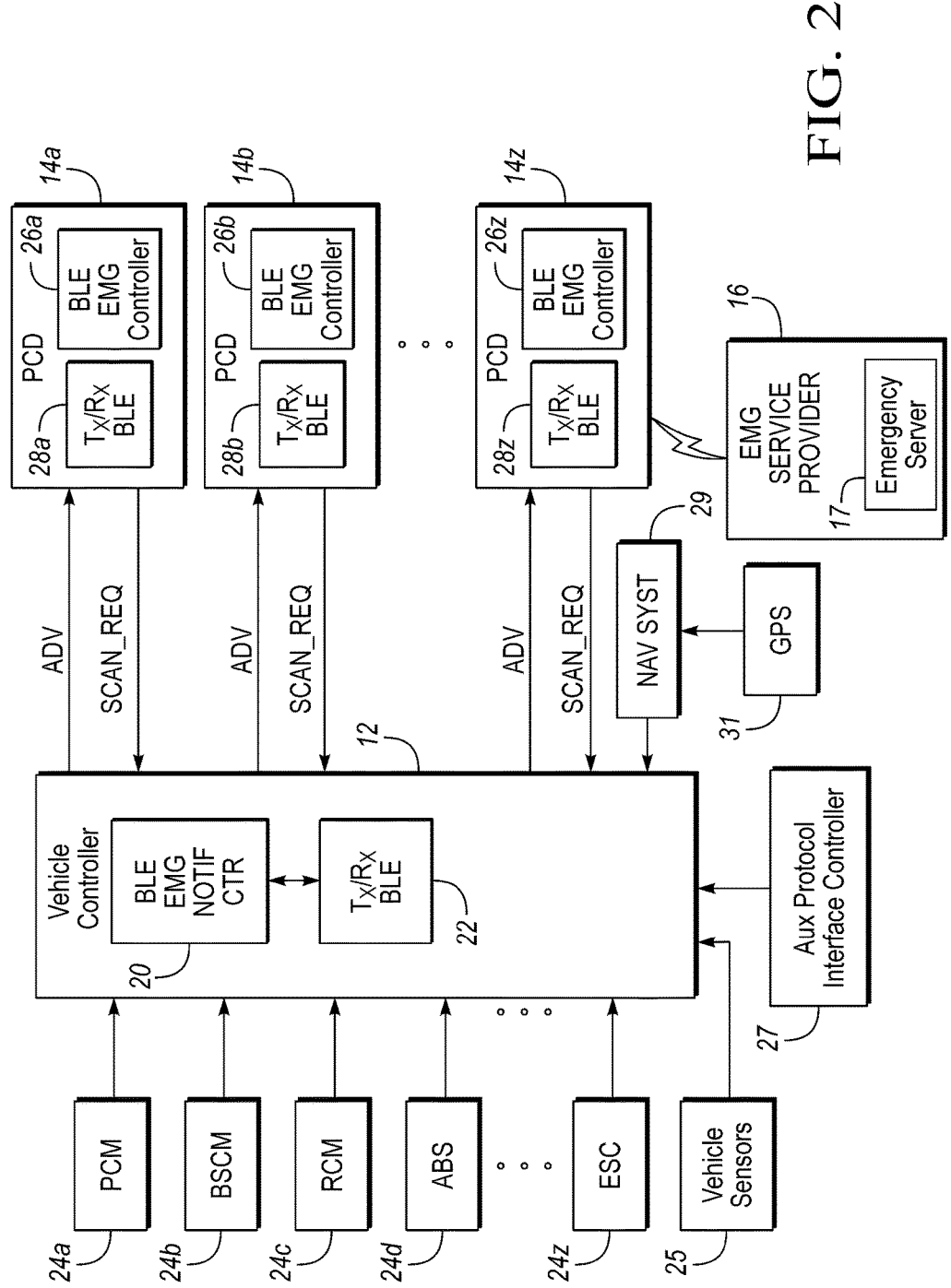
FIG. 2 depicts a vehicle controller for contacting an emergency service provider using a PCD in accordance to one embodiment.

FIG. 2 depicts a vehicle controller 12 positioned in the vehicle 10 for commanding the PCD 14 to contact the emergency server 17. The vehicle controller 12 includes a BLE emergency notification controller (or controller) 20 that is configured to transmit a request to the PCD 14 to contact the emergency personnel in response to determining that an emergency event occurred in the vehicle 10 (e.g., vehicle impact, air bag deployment, vehicle rollover, etc.). A BLE based transceiver 22 is electrically coupled to the controller 20. The controller 20 and the transceiver 22 on the vehicle 10 may be defined as an advertiser in the BLE environment. It is recognized that the transceiver 22 may be positioned either internal to the controller 20 or external to the controller 20.

The controller 20 may receive an electronic notification that an emergency event occurred from one or more vehicle controllers 24a-24z (hereinafter vehicle controllers 24) and/or sensors 25. In one example, the controller 20 may receive an electronic notification from one or more vehicle controllers 24 responsible for monitoring or controlling vehicle operating state, including, but not limited to, a powertrain controller 24a, brake system controller 24b, anti-lock brakes controller 24c, restraint controller 24d, and electronic stability controller 24z, including, for example, traction controller (not shown), yaw stability controller (not shown), and rollover stability controller (not shown).

As an alternative or in addition to an electronic notification from the one or more vehicle controllers 24, the controller 20 may receive electronic input signals from the one or more vehicle sensors 25, such as, but not limited to, accelerometers, pressure sensors, air bag deployment sensors, vehicle impact sensors, dash impact sensors, seat/occupant impact sensors, rollover sensors, temperature sensors, fuel flow cut-off switch, and so on. Emergency signals from these and other vehicle controllers and sensors may be received by wire, wirelessly, or over a vehicle network.

The controller 20 may further be hardwire connected to an auxiliary protocol interface controller 27, including, for example, the SYNC® system offered by Ford Motor Company®, a vehicle navigation system 29 equipped with a global positioning system (GPS) 31 and a visual front end interface (not shown) for user interaction, and a vehicle telematics controller (not shown) capable of establishing connectivity between a vehicle occupant's PCD and one or more remote wireless networks.

The PCD 14 includes a BLE emergency service contact controller 26 and a BLE based transceiver 28 to enable communication with the transceiver 22 on the vehicle 10 (or to enable communication with the vehicle 10). As mentioned previously, the controller 20 and the transceiver 22 on the vehicle 10 may be defined as an advertiser in the BLE environment. The controller 26 and the transceiver 28 on each corresponding PCD 14 may be defined as a scanner in the BLE environment. The controller 20 is configured to actively broadcast a signal ADV (or advertisement signal) in response to receiving an emergency event notification from the one or more vehicle controllers 24 and/or the vehicle sensors 25. In general, the controller 26 is configured to actively monitor for an electronic request from the controller 20 to contact the emergency server 17. For example, the controller 26 monitors for the signal ADV from the controller 20 of the vehicle 10 indicating that the vehicle 10 is experiencing an emergency condition.

The signal ADV generally serves as an electronic request from the controller 20 for the PCD 14 to contact the emergency server 17 and may include information pertaining to the vehicle 10, such as vehicle location, description of the vehicle, number of occupants, seat belt and/or air bag status, and so on. The signal ADV may further include a unique vehicle ID of the vehicle 10.

In one example, in response to receiving the signal ADV from the controller 20, the controller 26 determines whether the user of the PCD 14 accepted the electronic request to contact the emergency server 17. The controller 26 may, for example, determine whether the PCD user selected to accept or to reject the electronic request using the interactive display. If the PCD user accepted the request, the controller 26 may electronically contact the emergency server 17. The controller 26 may then transmit a signal SCAN_REQ to the controller 20 of the vehicle 10 electronically acknowledging that the emergency server 17 has been contacted.

The controller 20 may stop actively broadcasting the signal ADV in response to receiving the signal SCAN_REQ from the controller 26. In one example, the controller 20 may receive the signal SCAN_REQ from the controller 26 within a predetermined period prior to stopping the active broadcasting of the signal ADV. In such an example, the controller 20 may initiate a timer for a predetermined period prior to transmitting the signal ADV to the PCD 14. In another example, the controller 20 may check whether the signal SCAN_REQ includes the unique vehicle ID of the vehicle 10 prior to stopping the active broadcasting of the signal ADV.

In one example, if the user of the PCD 14 rejected the electronic request to contact the emergency server 17, the controller 26 may transmit a signal to the SPS 19 indicative of a request to contact the emergency server 17. The controller 26 may further transmit a signal SCAN_REQ to the controller 20 electronically acknowledging that the emergency server 17 has been contacted in response to receiving an electronic acknowledgement from the SPS 19 that the emergency server 17 contact has been established. These aspects will be discussed in more detail below.

As shown in FIG. 2 and generally described above, a system for contacting an emergency service using the PCD 14 includes a controller 20 configured to receive a vehicle state signal indicative of a vehicle 10 being in an emergency state, repeatedly transmit a request, via BLE, to the PCD 14 to contact an emergency provider 16 in response to receiving the vehicle state signal, and stop transmitting the request to contact the emergency provider 16 in response to receiving an acknowledgement from the PCD 14 that the emergency provider 16 was contacted.

Figure 3:
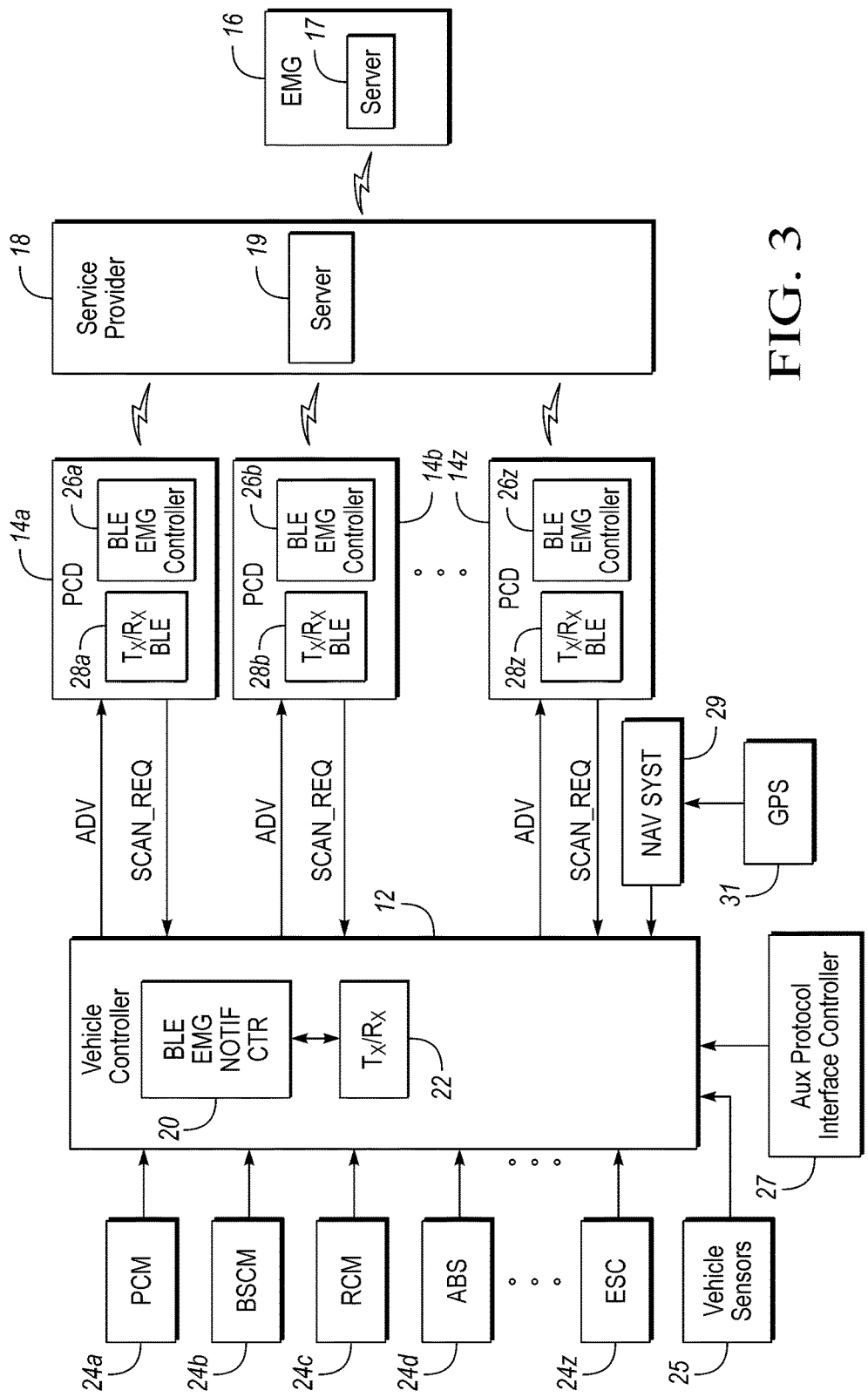
FIG. 3 depicts a vehicle controller for contacting an emergency service provider using a PCD in accordance to one embodiment.

FIG. 3 depicts the vehicle controller 12 for actively requesting the PCD 14 to contact the emergency server 17 according to one embodiment. The controller 26 of the PCD 14 may determine that the user of the PCD 14 rejected the electronic request to contact the emergency server 17, e.g., the user of the PCD 14 elected to reject the request using the interactive display. The controller 26 may then transmit a signal to the SPS 19 indicating that the emergency server 17 may need to be contacted. The SPS 19 may contact the emergency server 17 in response to receiving from the controller 26 of the PCD 14 the signal indicating that the emergency server 17 may need to be contacted.

In one example, the SPS 19 may wait a predetermined period prior to contacting the emergency server 17 in response to receiving the request to contact the emergency server 17 on behalf of the vehicle 10. In another example, the SPS 19 may wait to receive a predetermined number of requests to contact the emergency server 17 from one or more PCDs 14 prior to contacting the emergency server 17.

In general, the controller 26 is configured to receive the electronic acknowledgement signal from the SPS 19 acknowledging that the emergency server 17 has been contacted. The controller 26 transmits the signal SCAN_REQ to the controller 20 in response to receiving the electronic acknowledgement signal from the SPS 19. In one example, the controller 26 may receive the electronic acknowledgement signal from the SPS 19 within a predetermined period prior to transmitting the signal SCAN_REQ to the controller 20. In such an example, the controller 26 may initiate a timer for a predetermined period in response to transmitting the electronic request to contact the emergency server 17 to the SPS 19.

The controller 20 may stop actively broadcasting the signal ADV in response to receiving the signal SCAN_REQ from the controller 26. In one example, the controller 20 may check whether the signal SCAN_REQ includes unique vehicle ID of the vehicle 10 prior to stopping the active broadcasting of the signal ADV. These aspects will be discussed in more detail in reference to FIG. 4.

As shown in FIG. 3 and generally described above, a PCD 14 for contacting an emergency service includes a controller 26 including a transceiver 28, where the controller 26 is configured to receive a request from the vehicle 10, via BLE, to contact an emergency provider 16, and transmit an acknowledgement to the vehicle 10, via BLE, that the emergency provider 16 was contacted in response to either receiving a first input accepting the request and contacting the emergency provider 16, or receiving a second input rejecting the request, transmitting the request to an SPS 19, and receiving from the SPS 19 a signal indicating that the emergency provider 16 was contacted.

Figure 4:
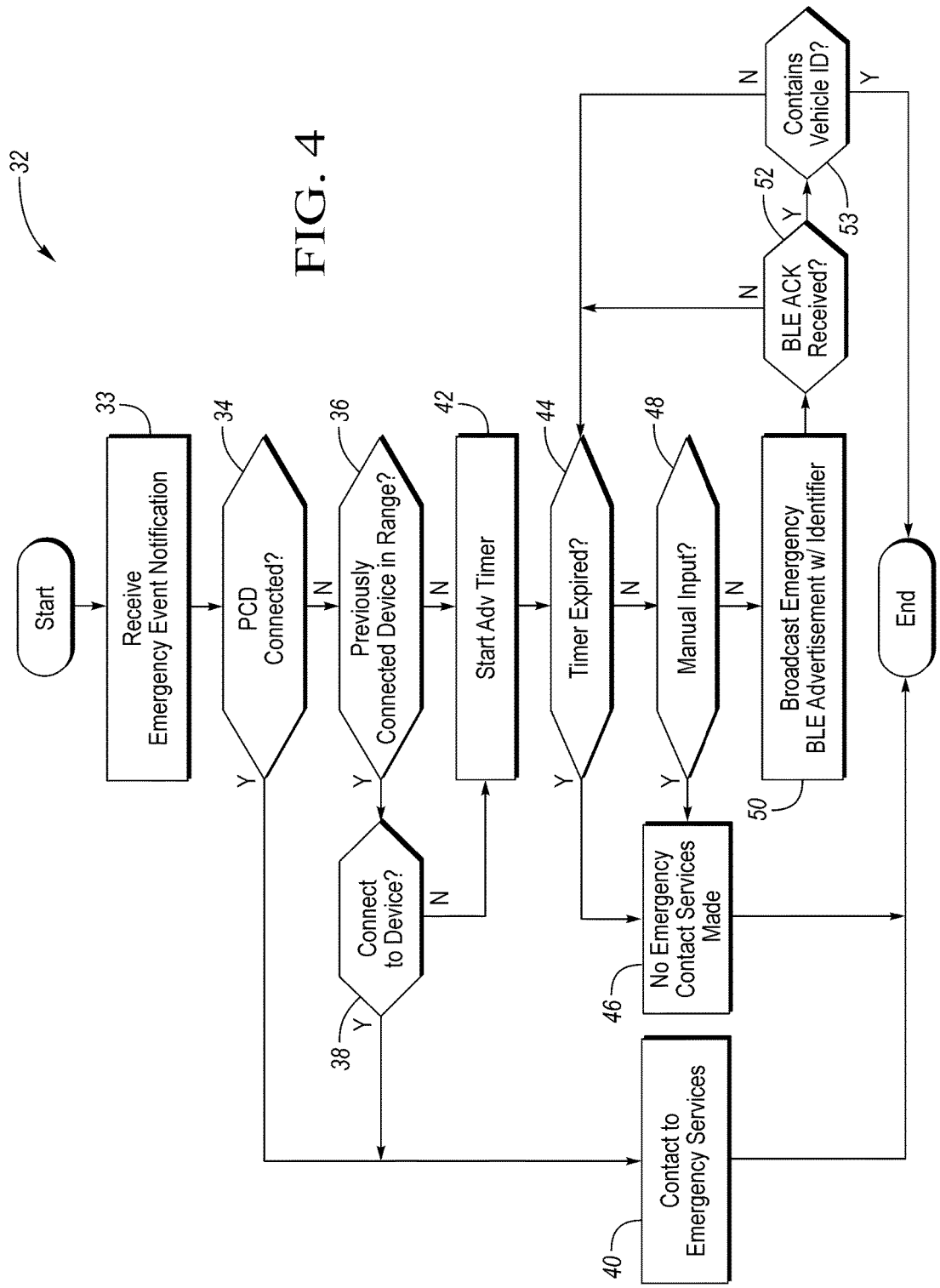
FIG. 4 depicts a method for electronically initiating an emergency call utilizing the vehicle controller of FIG. 3 in accordance to one embodiment.

FIG. 4 illustrates a process 32 for actively requesting a PCD 14 to contact the emergency server 17 according to one embodiment. The process 32 begins at block 33, at which point the controller 20 receives an electronic notification that an emergency event occurred from one or more vehicle controllers 24 and/or sensors 25.

As described above, the controller 20 may receive an electronic notification from the one or more vehicle controllers 24 responsible for vehicle operating state, including, but not limited to, the powertrain controller 24a, brake system controller 24b, anti-lock brakes controller 24c, restraint controller 24d, electronic stability controller 24z, and so on, as well as, one or more vehicle sensors 25, such as, but not limited to, accelerometers, pressure sensors, air bag deployment sensors, vehicle impact sensors, dash impact sensors, seat/occupant impact sensors, rollover sensors, temperature sensors, fuel flow cut-off switch, and so on.

At block 34, the controller 20 of the vehicle 10 determines whether one or more PCDs 14 are currently connected to the vehicle 10. At block 40, if one or more PCDs 14 are currently connected to the vehicle 10, the controller 20 electronically contacts the emergency server 17 using the currently connected PCD 14. At block 36, if no PCD 14 is currently connected to the vehicle 10, the controller 20 determines whether a previously paired PCD 14 is located within a predetermined signal range of the vehicle 10. In one example, the controller 20 determines whether at least one PCD 14 located within a predetermined signal range of the vehicle 10 has been previously paired with the vehicle telematics controller.

At block 38, if at least one PCD 14 located within a predetermined signal range of the vehicle 10 has been previously paired with the vehicle telematics controller, the controller 20 determines whether a connection to the previously paired PCD 14 was successful. For example, the controller 20 determines whether the vehicle telematics controller successfully connected to the previously paired PCD 14 via a wireless network connection.

At block 40, the controller 20 electronically contacts the emergency server 17 using the previously paired PCD 14, in response to determining that the vehicle telematics controller successfully connected to the previously paired PCD 14 located within a predetermined signal range of the vehicle 10. At block 42, if the vehicle telematics controller did not successfully connect to the previously paired PCD 14, the controller 20 initiates an advertisement timer for a predetermined period.

At block 44, the controller 20 determines whether the advertisement timer has expired. In one example, the controller 20 determines that the advertisement timer has expired when a predetermined period has lapsed following the starting of the timer. At block 46, if the advertisement timer has expired, the controller 20 determines that no emergency call was made before the advertisement timer has expired, e.g., a predetermined period has lapsed following the starting of the timer, and exits the process 32. At block 48, if the advertisement timer has not expired, the controller 20 determines whether a manual request to stop advertisement has been received. In one example, the manual request to stop advertisement is a user input via the visual front end interface of the vehicle 10. At block 46, if the manual request to stop advertisement has been received, the controller 20 determines that no call to the emergency server 17 was made and exits the process 32.

At block 50, the controller 20 begins actively broadcasting the signal ADV to one or more PCDs 14 in response to determining that the advertisement timer has not expired and that the manual request to stop active broadcasting has not been received. As previously described in reference to FIG. 2, the signal ADV may include information pertaining to the vehicle 10, such as vehicle location, description of the vehicle, number of occupants, and so on. The signal ADV may further include the unique vehicle ID of the vehicle 10.

At block 52, the controller 20 determines whether it received the signal SCAN_REQ from the PCD 14. The signal SCAN_REQ may generally indicate that the emergency server 17 was contacted. In one example, the signal SCAN_REQ may indicate that at least one of the PCD 14 and the SPS 19 established contact with the emergency server 17. If the controller 20 determines that it has not received the signal SCAN_REQ, the controller 20 returns to block 44 at which point it determines whether the advertisement timer has expired.

At block 53, in response to determining that it received the signal SCAN_REQ, the controller 20 determines whether the signal SCAN_REQ includes the unique vehicle ID. If not, the controller 20 returns to block 44 at which point it determines whether the advertisement timer has expired. If the controller 20 determines that the received signal SCAN_REQ includes the unique vehicle ID, the controller 20 exits the process 32. Thus the controller 20 stops actively broadcasting the signal ADV in response to receiving the signal SCAN_REQ that includes the unique vehicle ID of the vehicle 10.

At this point, the process 32 may end. In some embodiments, the process 32 may be repeated in response to the controller 20 receiving an electronic notification that an emergency event occurred from one or more vehicle controllers 24 and/or sensors 25 or in response to another electronic notification.

As shown in FIG. 4 and generally described above, a method for actively requesting a PCD 14 to contact an emergency provider 16 includes receiving, by the controller 20 in connection with the transceiver 22, a vehicle emergency state signal, transmitting a request, via BLE, to the PCD 14 to contact the emergency provider 16 in response to the emergency state signal, receiving, at the controller 20, via BLE, a PCD acknowledgement indicating the emergency provider 16 was contacted, and stopping, at the controller 20, the transmitting of the request in response to receiving the acknowledgement.

Figure 5A:
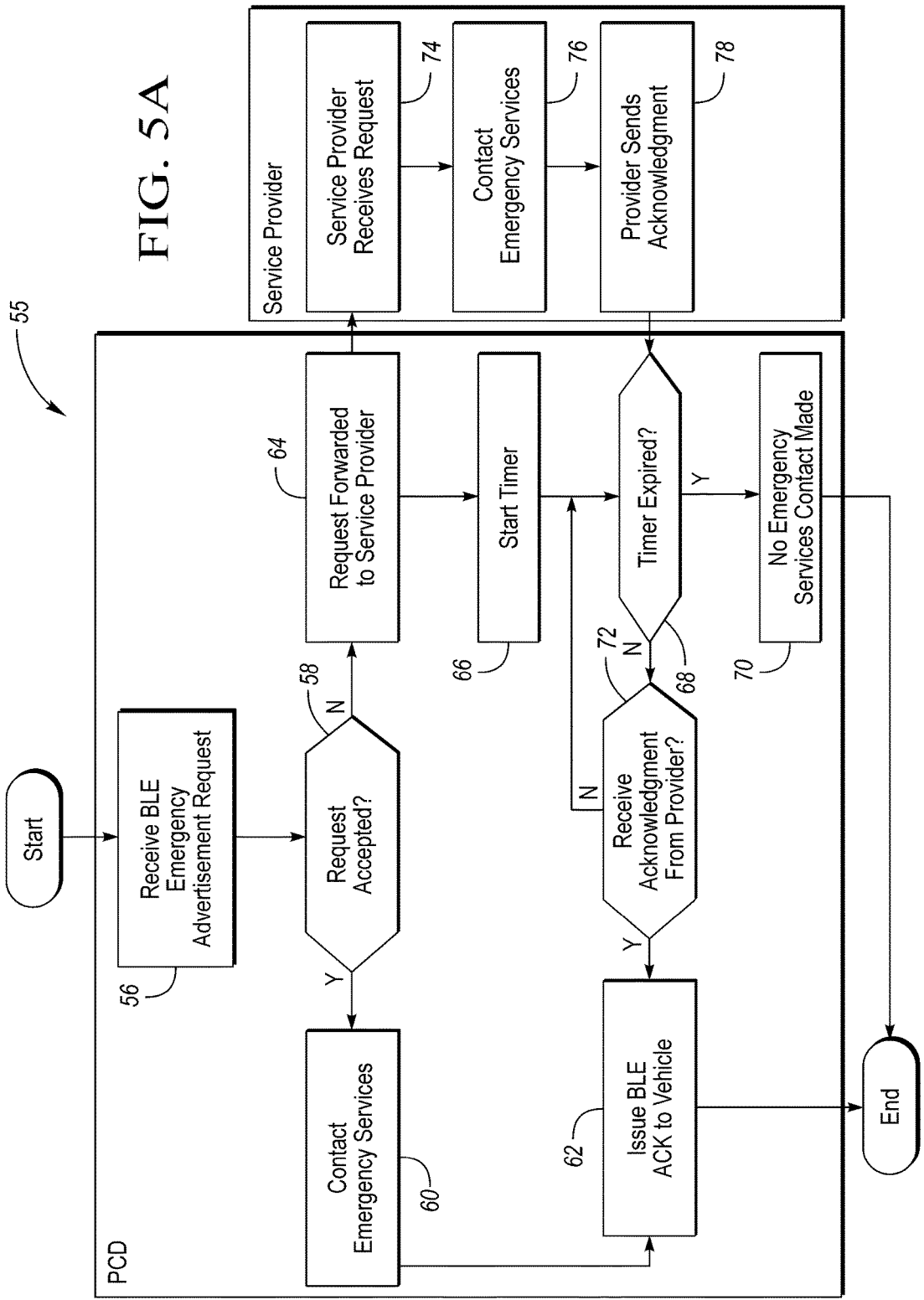
FIGS. 5A-5B depict methods for electronically initiating an emergency call also utilizing the vehicle controller of FIG. 3 in accordance to one embodiment.

FIG. 5A illustrates a process 55 for actively requesting a PCD 14 to contact the emergency server 17 according to one embodiment. The process 55 begins at block 56 at which point the controller 26 of the PCD 14 receives an electronic request from the controller 20 to contact the emergency server 17. In one example, the controller 26 via the BLE transceiver 28 actively monitors for and receives the signal ADV from the controller 20.

At block 58, the controller 26 determines whether the user of the PCD 14 accepted the electronic request to contact the emergency server 17. In one example, the PCD user may accept the electronic request via the interactive display of the PCD 14. At block 60, if the PCD user accepted the request, the controller 26 electronically contacts the emergency server 17. At block 62, the controller 26 transmits the signal SCAN_REQ to the controller 20 of the vehicle 10 electronically acknowledging that the emergency server 17 contact has been established. In one example, the signal SCAN_REQ may include the unique vehicle ID.

At block 64, if the PCD user rejected the electronic request to contact the emergency server 17, e.g., the PCD user elected to reject the request via the interactive display of the PCD 14, the controller 26 transmits a signal to the SPS 19 indicating that the emergency server 17 may need to be contacted on behalf of the vehicle 10. The signal to the SPS 19 may include information pertaining to the vehicle 10, such as vehicle location, description of the vehicle, number of occupants, seat belt and/or air bag status, and so on. The signal may further include a unique vehicle ID of the vehicle 10.

At block 66, the controller 26 initiates a timer in response to transmitting the signal to the SPS 19. At block 68, the controller 26 determines whether the timer has expired, e.g., a predetermined period has lapsed following the starting of the timer. At block 70, if the timer has expired, the controller 26 determines that the emergency server 17 has not been contacted and exits the process 55 without transmitting a SCAN_REQ signal to the controller 20. At block 72, if the controller 26 determines at block 68 that the timer has not expired, the controller 26 determines whether it received from the SPS 19 the electronic acknowledgement that the SPS 19 contacted the emergency server 17. If so, at block 62 the controller 26 transmits the signal SCAN_REQ to the controller 20 of the vehicle 10 electronically acknowledging that the emergency server 17 has been contacted. In one example, the signal SCAN_REQ may include the unique vehicle ID. If the controller 26 determines that it has not received from the SPS 19 the electronic acknowledgement that the SPS 19 contacted the emergency server 17, the controller 26 returns to block 68 at which point it determines whether the timer has expired.

At block 74, the SPS 19 receives the electronic request to contact the emergency server 17 on behalf of the vehicle 10. At block 76, the SPS 19 electronically contacts the emergency server 17 in response to receiving the request. In one example, the SPS 19 waits a predetermined period prior to contacting the emergency server 17 in response to receiving the electronic request to contact the emergency server 17 on behalf of the vehicle 10. In another example, the SPS 19 waits to receive a predetermined number of electronic requests to contact the emergency server 17 from one or more PCDs 14 prior to contacting the emergency server 17. This aspect will be discussed in more detail in reference to FIG. 5B.

At block 78, the SPS 19 transmits the acknowledgement to the controller 26 of the PCD 14 that the contact with the emergency server 17 has been established. The acknowledgement signal from the SPS 19 includes the unique vehicle ID of the vehicle 10.

At this point the process 55 may end. In some embodiments, the process 55 may be repeated in response to the controller 26 receiving an electronic request to contact the emergency server 17 or in response to another electronic notification or request.

Figure 5B:
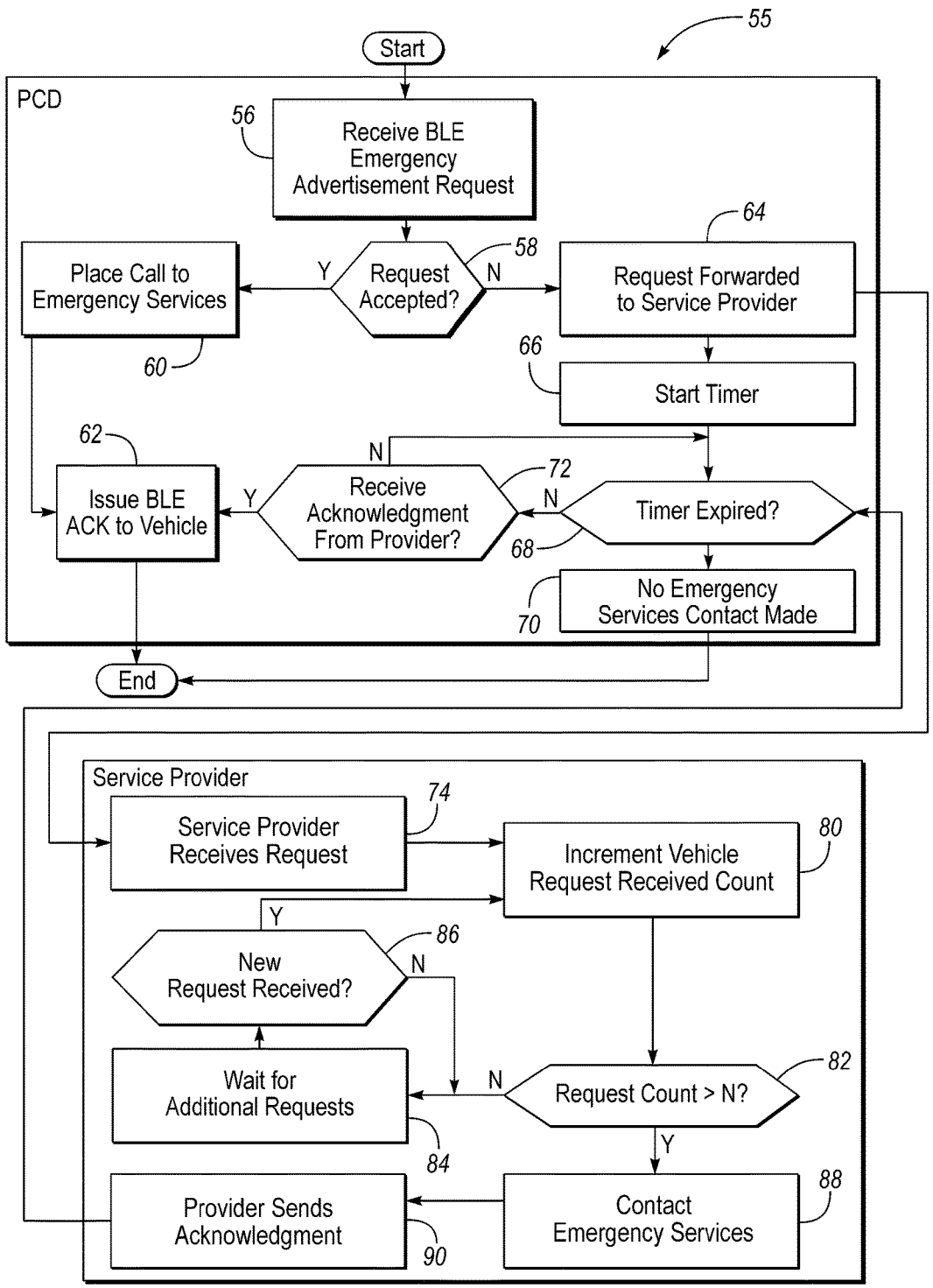

FIG. 5B illustrates a process 55 for actively requesting a PCD 14 to contact the emergency server 17 according to one embodiment. Consistent with the description provided in reference to FIG. 5A, the process 55 begins at block 56 at which point the controller 26 of the PCD 14 receives the electronic request to contact the emergency server 17. As in reference to FIG. 5A, the process 55 proceeds from block 58 to block 74. At block 74, the SPS 19 receives an electronic request to contact the emergency server 17 on behalf of the vehicle 10.

At block 80, the SPS 19 increments a received emergency contact request count. At block 82, the SPS 19 determines whether the request count is greater than a predetermined value. At block 84, in response to determining at block 82 that the request count is less than a predetermined value, the SPS 19 waits for additional requests. In one example, the SPS 19 may wait a predetermined period for additional requests.

At block 86, the SPS 19 determines whether a new request to contact the emergency server 17 has been received. At block 80, in response to determining at block 86 that it received a new request to contact the emergency server 17, the SPS 19 increments the received emergency contact request count. In one example, the SPS 19 determines, based on a unique vehicle ID, whether the received new request is for the same vehicle 10 as the initial request prior to incrementing the received emergency contact request count.

The SPS 19 returns to block 84 in response to determining at block 86 that it has not received a new request to contact the emergency server 17, e.g., the SPS 19 has not received a new request having the same unique vehicle ID as the initial request. At block 84, the SPS 19 waits a predetermined period for additional requests to contact the emergency server 17.

At block 88, the SPS 19 contacts the emergency server 17 in response to determining at block 82 that the received emergency contact request count is greater than a predetermined value. At block 90, the SPS 19 transmits the acknowledgement to the controller 26 of the PCD 14 indicating that the contact with the emergency server 17 has been established. The acknowledgement signal from the SPS 19 may include the unique vehicle ID of the vehicle 10. At this point the process 55 may end. In some embodiments the process 55 as described in reference to FIG. 5B may be repeated in response to receiving an electronic request to contact the emergency server 17 or another notification or request.

While example embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle system comprising: a controller configured to: responsive to a vehicle being in an emergency state, initiate a timer after determining whether a previously connected personal communication device (PCD) is within a predetermined signal range of the vehicle; repeatedly transmit a request including a unique identifier of the vehicle, via Bluetooth Low Energy (BLE), to a non-previously connected PCD to contact an emergency provider; and stop transmitting the request responsive to an acknowledgement from the PCD including the identifier that the emergency provider was contacted.

2. The vehicle system of claim 1 wherein the PCD was not previously electrically connected to the vehicle.

3. The vehicle system of claim 1 wherein the controller is further configured to receive the acknowledgement, via BLE, from the PCD in response to the PCD receiving an input accepting the request to contact the emergency provider.

4. The vehicle system of claim 1 wherein the controller is further configured to receive the acknowledgement, via BLE, from the PCD in response to:
   (i) the PCD receiving an input rejecting the request,
   (ii) the PCD transmitting the request to a service provider server (SPS), and
   (iii) the PCD receiving a signal from the SPS indicating that the emergency provider was contacted.

5. The vehicle system of claim 1, wherein the controller is further configured to transmit the request to the PCD to contact the emergency provider in response to determining that the timer has not expired and the previously connected PCD is not within the predetermined signal range of the vehicle.

6. The vehicle system of claim 1, wherein the controller is further configured to stop transmitting the request to contact the emergency provider in response to determining that the timer expired.

7. The vehicle system of claim 1 wherein the controller is further configured to receive a first input indicative of a user command at the vehicle to stop transmitting the request to the PCD.

8. The vehicle system of claim 1 wherein the request includes at least one of a vehicle location, a vehicle description, a number of vehicle occupants, a seat belt status, an air bag status, and a vehicle-specific identifier.

9. A personal communication device comprising: a controller configured to: receive a request from a vehicle, via Bluetooth Low Energy (BLE), to contact an emergency provider, the request including a unique identifier of the vehicle; in response to receiving a first input accepting the request and contacting the emergency provider, transmit an acknowledgement including the identifier to the vehicle, via BLE, that the emergency provider was contacted; and in response to receiving a second input rejecting the request, transmitting the request to a service provider server (SPS), and receiving from the SPS a signal including the identifier and indicating that the emergency provider was contacted, transmit an acknowledgement including the identifier to the vehicle, via BLE, that the emergency provider was contacted.

10. The personal communication device of claim 9 wherein the controller is further configured to transmit to the vehicle, via BLE, the acknowledgement that the emergency provider was contacted in response to (i) receiving the second input rejecting the request, (ii) transmitting the request to the SPS, and (iii) receiving from the SPS, within a predetermined period, the signal indicating that the emergency provider was contacted.

11. A method for a vehicle comprising: receiving, by a controller including a transceiver, a vehicle emergency state signal; transmitting a request including a unique identifier of the vehicle, via Bluetooth Low Energy (BLE), to a personal communication device (PCD) to contact an emergency provider in response to the emergency state signal and after an initiation of a timer following a determination whether a previously connected PCD is within a predetermined signal range of the vehicle; receiving, at the controller, via BLE, a PCD acknowledgement including the identifier and indicating the emergency provider was contacted; and stopping, at the controller, the transmitting of the request in response to receiving the acknowledgement.

12. The method of claim 11 wherein the PCD was not previously electrically connected to the vehicle.

13. The method of claim 11 wherein receiving the acknowledgement, via BLE, from the PCD is in response to the PCD receiving an input indicative of a user accepting the request to contact the emergency provider.

14. The method of claim 11 wherein receiving the acknowledgement from the PCD is in response to: (i) the PCD receiving an input indicative of a user rejecting the request to contact the emergency provider, (ii) the PCD transmitting the request to a service provider server (SPS), and (iii) the PCD receiving a signal from the SPS indicating that the emergency provider was contacted.

15. The method of claim 11, wherein transmitting the request to the PCD to contact the emergency provider is in response to, at the controller, determining that the timer has not expired and the previously connected PCD is not within the predetermined signal range of the vehicle.

16. The method of claim 11, wherein stopping of transmitting of the request to contact the emergency provider is in response to, at the controller, determining that the timer expired.

17. The method of claim 11 wherein stopping of transmitting of the request to contact the emergency provider is in response to receiving, at the controller, a first input indicative of a user command at the vehicle to stop transmitting the request to the PCD.

18. The method of claim 11 wherein the request to contact the emergency provider includes at least one of a vehicle location, a vehicle description, a number of vehicle occupants, a seat belt status, an air bag status, and a vehicle-specific identifier.

* * * * *